No. 658,796. Patented Oct. 2, 1900.
C. J. MERRITT.
CUSPIDOR.
(Application filed Aug. 18, 1899. Renewed Aug. 20, 1900.)

(No Model.)

WITNESSES:
J. P. Appleman
E. E. Potter

INVENTOR
Charles J. Merritt
BY
N. C. Evert & Co.
ATTORNEYS.

THE NORRIS PETERS CO., PHOTO-LITHO., WASHINGTON, D. C.

UNITED STATES PATENT OFFICE.

CHARLES J. MERRITT, OF DUQUESNE, PENNSYLVANIA.

CUSPIDOR.

SPECIFICATION forming part of Letters Patent No. 658,796, dated October 2, 1900.

Application filed August 18, 1899. Renewed August 20, 1900. Serial No. 27,427. (No model.)

*To all whom it may concern:*

Be it known that I, CHARLES J. MERRITT, a citizen of the United States of America, residing at Duquesne, in the county of Allegheny and State of Pennsylvania, have invented certain new and useful Improvements in Cuspidors, of which the following is a specification, reference being had therein to the accompanying drawings.

This invention relates to certain new and useful improvements in cuspidors, and more particularly to that class that are designed not to spill the contents when upset.

The invention has for its object the provision of novel means whereby the opening will be automatically closed when tilted or upset.

The invention has for its further object to construct a receptacle of this class that will be extremely simple in its construction, strong, durable, and comparatively inexpensive to manufacture.

With the above and other objects in view the invention finally consists in the novel construction, combination, and arrangement of parts to be hereinafter more fully described, and specifically pointed out in the claims.

In describing the invention in detail reference is had to the accompanying drawings, forming a part of this specification, wherein like numerals of reference indicate corresponding parts throughout the several views, and in which—

Figure 1:
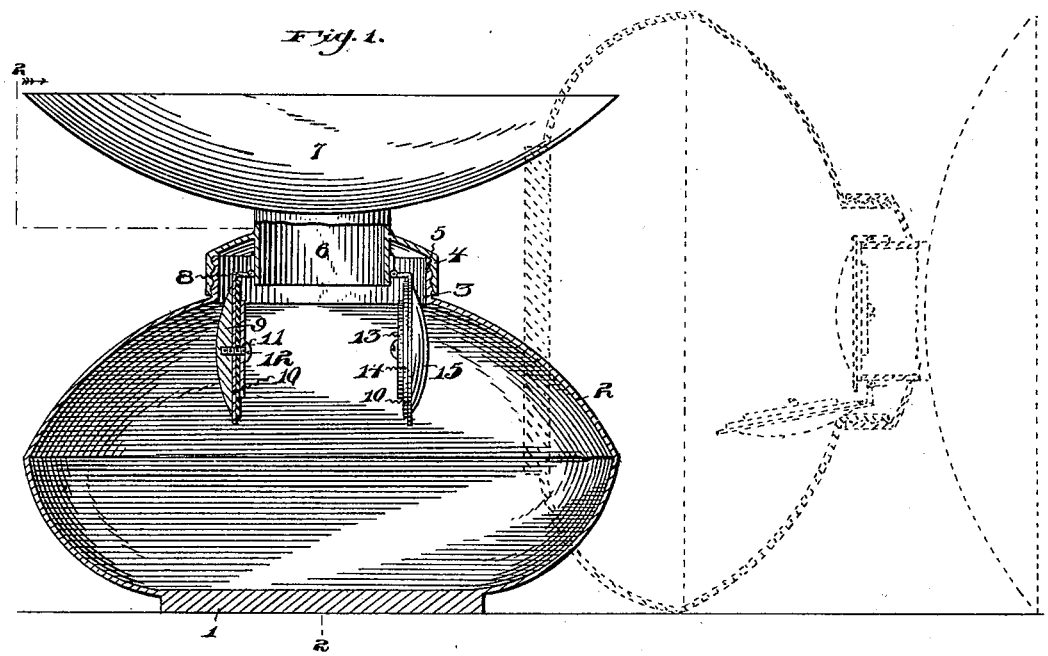
Figure 2:
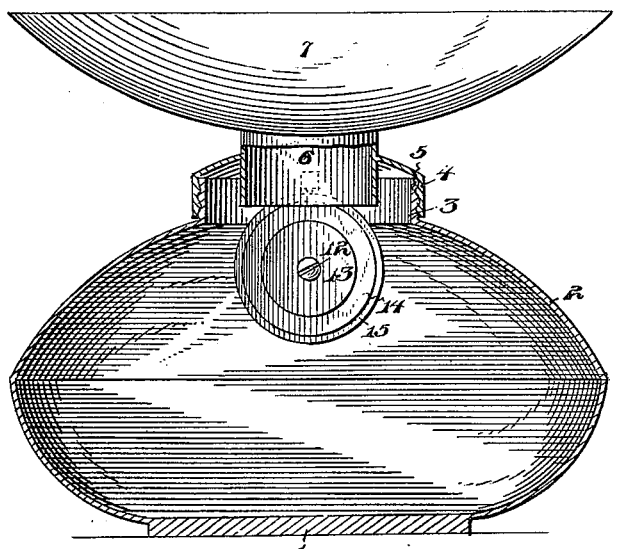

Figure 1 is a side elevation of my improved cuspidor, which is partly in vertical section, and showing in dotted lines the position of the parts when tilted or upset. Fig. 2 is a vertical sectional view taken on the line 2 2 of Fig. 1.

Referring to the drawings by reference-numerals, 1 indicates the base, and 2 the lower casing, said casing or receptacle having an opening 3 at its top, said opening terminating in an interior screw-threaded collar 4, said screw-threaded collar being adapted to receive an interiorly-screw-threaded hood 5, said hood having formed integral therewith a downwardly-extending spout 6, the upper end of said spout carrying an inverted-bell-shaped portion 7, being formed integral therewith. Near the lower extremity of the said spout are arranged directly opposite each other upon the sides thereof hinges 8, said hinges being provided with gravity-valves 9 9, said valves consisting of a disk 10, which is centrally apertured at 11 for the reception of the screw 12, said screw serving to also retain the plate 13 and gasket 14. A convexed weighted portion 15 is also attached by means of the screw 12, retaining the parts together.

The operation of my improved cuspidor is as follows: When the same is accidently tilted or upset, the gravity-valves will assume the position as shown in dotted lines of Fig. 1 of the drawings, and one of them will close the opening of the spout, thereby preventing the contents of the vessel from being discharged from the same, and when tilted in the opposite direction the opposite valve will serve to perform the function for which it is designed, or, in other words, the gravity-valves occupy normally an open position and are adapted when operated to alternately close the spout 3, the operation of the valves being caused by the tilting of the cuspidor, as heretofore stated.

The many advantages obtained by the use of my improved cuspidor will be readily apparent, and a further description of the same is deemed unnecessary.

It will be noted that various changes may be made in the details of construction without departing from the general spirit of my invention.

Having thus fully described my invention, what I claim as new, and desire to secure by Letters Patent, is—

1. In a cuspidor, a casing, a spout extending downwardly therein, and a pair of gravity-valves normally occupying an open position connected to the said spout and adapted when operated to alternately close the said spout, substantially as described.

2. In a cuspidor, a casing, a spout extending downwardly therein, a pair of hinges suitably connected thereto, a gravity-valve normally occupying an open position connected to each of the said hinges, and adapted when operated to alternately close the said spout, and each of the said valves consisting of a disk having suitably secured thereto a plate, gasket and weight, substantially as set forth.

3. In a cuspidor, the combination of a casing, a screw-threaded collar formed integral therewith, an inverted-bell-shaped portion, a spout formed integral therewith, a hood formed integral with the said spout and adapted to be secured to the said collar for supporting the said bell-shaped portion and spout, and a pair of gravity-valves normally occupying an open position connected to the said spout and adapted when operated to alternately close the same.

In testimony whereof I affix my signature in the presence of two witnesses.

CHARLES J. MERRITT.

Witnesses:
JOHN NOLAND,
E. W. ARTHUR.